US007140869B2

(12) United States Patent
Toncelli

(10) Patent No.: US 7,140,869 B2
(45) Date of Patent: Nov. 28, 2006

(54) DISTRIBUTOR OF MIXES CONSISTING OF AGGLOMERATED CERAMIC OR STONE MATERIAL FOR FILLING A MOLD

(76) Inventor: Luca Toncelli, Viale Asiago 34, 36061 Bassano del Grappa (Vicenza) (IT)

( * ) Notice: Subject to any disclaimer, the term of this patent is extended or adjusted under 35 U.S.C. 154(b) by 0 days.

(21) Appl. No.: 11/116,102

(22) Filed: Apr. 27, 2005

(65) Prior Publication Data

US 2005/0238752 A1 Oct. 27, 2005

Related U.S. Application Data

(63) Continuation of application No. PCT/EP03/11990, filed on Oct. 29, 2003.

(30) Foreign Application Priority Data

Oct. 31, 2002 (IT) .......................... TV2002A0131

(51) Int. Cl.
*A01J 21/00* (2006.01)

(52) U.S. Cl. ...................... 425/449; 425/447; 249/131; 249/156; 249/158; 249/161

(58) Field of Classification Search ................ 425/447, 425/449; 249/161, 158, 156, 131, 130
See application file for complete search history.

(56) References Cited

U.S. PATENT DOCUMENTS

| | | | | |
|---|---|---|---|---|
| 1,726,511 | A * | 8/1929 | Vernor et al. | 34/381 |
| 3,663,137 | A * | 5/1972 | Haas et al. | 425/148 |
| 3,954,377 | A * | 5/1976 | Scholz et al. | 425/432 |
| 4,321,028 | A | 3/1982 | Van de Caveye | |
| 4,602,771 | A * | 7/1986 | Milliron | 266/281 |
| 4,695,418 | A * | 9/1987 | Baker et al. | 264/151 |
| 5,338,179 | A * | 8/1994 | Luca | 425/447 |
| 6,086,349 | A * | 7/2000 | Del Monte | 425/62 |

FOREIGN PATENT DOCUMENTS

| | | |
|---|---|---|
| DE | 294 453 | 10/1991 |
| ES | 2 172 418 | 9/2002 |
| FR | 864846 | 5/1941 |
| FR | 1.591.141 | 6/1970 |
| FR | 2.052.704 | 4/1971 |
| JP | 2001-162612 | 6/2001 |

OTHER PUBLICATIONS

International Search Report dated Mar. 23, 2003.
International Preliminary Examination Report dated Jan. 11, 2005.

* cited by examiner

*Primary Examiner*—Joseph S. Del Sole
*Assistant Examiner*—Maria Veronica Ewald
(74) *Attorney, Agent, or Firm*—Katten Muchin Rosenman LLP

(57) ABSTRACT

A mix distributor (10) for filling a tray-like mold (100) comprises a fixed structure (20), having a distribution surface (24) supporting a mold (100), and a movable housing (30), displaceable above the mold (100) The movable housing is provided with a hopper containing the mix having at its bottom end a port (50) for discharging the mix.

An extractor belt (60) which is integral with and positioned underneath the hopper (40), forming the bottom thereof, is able to receive and convey the discharged mi (110) so that it falls by effect of gravity into the mold (100) and is unformly distributed.

15 Claims, 5 Drawing Sheets

DISTRIBUTOR OF MIXES CONSISTING OF AGGLOMERATED CERAMIC OR STONE MATERIAL FOR FILLING A MOLD

CROSS-REFERENCE TO RELATED APPLICATIONS

This application is a continuation of International Application PCT/EP2003/011990 filed on Oct. 29, 2003, now International Publication Number WO 2004/039547 published on May 13, 2004 and claims priority from Italian Patent Application TV2002A000131 filed on Oct. 31, 2002, the contents of which are herein wholly incorporated by reference.

DESCRIPTION

The present invention relates to a mix distributor for filling a mold having a substantially constant thickness with a mix of agglomerated ceramic or stone material.

The mix is formed by a mixture of granular material consisting of either natural or artificial hard stone or baked clay, which has a given grain size and the quantities of which are metered in a controlled manner, and by either an organic binder, chosen from among synthetic resins, or an inorganic binder, for example of the cement-based type.

These mix distributors are used for the manufacture of articles, particularly in the form of slabs, in plants consisting of a mix preparation station which is fed with the components forming the mix and in which mixing of the granular stone or ceramic material and the chosen binder is performed. The mix is transferred to a distributor which has the function of pouring and distributing the mix inside the molds which are filled uniformly.

Examples of mix distributors known in the art are disclosed by the patents FR-A-864 846, FR-A-1 591 141, FR-A-2 052 704, DE-A-294 453, U.S. Pat. No. 4,321,028.

The mix normally has the consistency of a wet sand, which tends to pack together in lumps, particularly when the binder consists of a viscous or sticky resin. The mold containing the mix is transferred to a station where the mix is compacted, for example by means of a simultaneous pressing and vibrating action in a vacuum environment (as described in the patent IT-A-1,056,388). Subsequently, the mix is transferred to a catalysis station when the binder is resinous or to a hardening station when the binder is of the inorganic type. Finally, the hardened slab is extracted from the mold and transferred to the subsequent processing steps such as sizing and smoothing/polishing.

In the parent U.S. Pat. No. 5,338,179 filed by the present Applicant an example of a distributor according to the known art, particularly suitable for sticky resin-based mixes, is described which comprises a fixed housing supporting the mold which must be uniformly filled with the mix of agglomerate material delivered by the said distributor.

The fixed housing has, mounted thereon, a movable housing equipped with a motor means so as to be displaceable above the mold such that the mix can be poured and distributed over the entire surface of the mold. The movable housing is provided with a hopper movable in the vertical direction and containing the mix of stone material and having at the bottom end a port for discharging the mix. The hopper is also equipped internally with a rotating shaft having blades which push and accompany the mix towards the discharge port so as to facilitate distribution of the mix inside the mold.

The mix distributed inside the mold forms a layer, the thickness of which is equal to the distance between the port for discharging the material from the hopper and the bottom of the mold. The distributor in question is therefore of the volumetric type since, by suitably adjusting the vertical position of the hopper, the thickness of the layer of mix and therefore of the resultant slab is varied.

In particular, a liquid or powder dye may be added onto the upper surface of the mix, before reaches the distributor, by means of a dye dispenser such as described in Italian patent No 1 273 903 filed in the name of the present Applicant.

The aim is that of obtaining an end product with colored effects similar to those of natural stone and in particular of creating vertical effects or tones which imitate as far as possible those which are typical of natural stone.

The dye is distributed over the surface of the mix in a discontinuous and irregular manner and in a predefined and metered quantity. The dye is basically “sprinkled” over the surface of the mix and then partially mixed with the remainder of the mix, without, however, altering the substantially localized distribution of dye with respect to the surface of the mix layer, which is a necessary condition for creating a final product with veined effects.

The mix distributor described in the mentioned Italian patent, although it is able to produce finished slabs with particular colored and veined effects, nevertheless poses technology-related problems.

In fact, whereas the mix distributor is displaced in order to pour the mix uniformly into the mold, the shaft equipped with blades stirs the mix so that, even if at the beginning the dye has the desired irregular and localized distribution necessary for creating the veined effects in the final slab, as distribution proceeds, the mix contained inside the hopper is mixed up by the shaft with blades and in this way homogenization of the mix occurs. The result is that the slab does not have the same appearance and therefore visual effect over the whole of its surface, but in the part of the slab in which the mix was last distributed the aesthetic properties vary and differ from the desired aesthetic effect.

The object of the present invention is therefore that of solving in an industrially advantages manner the problems mentioned above with reference to the known art and particularly of providing a distributor with a simple construction which leads to the production of slabs, the aesthetic properties of which are optimum and uniform over their whole surface.

Moreover, the distributor must be able to be easily adjusted upon variation of the characteristics—such as the shape and thickness—of the layer of mix to be poured inside the mold and to allow an easy metering of the quantity of mix to be introduced into the hopper in order to form a slab with the required thickness and dimensions.

Last but not least, the distributor must function in such a way as to ensure that the mix is able to flow our easily and with a uniform thickness, even in the case of mixes having different physical properties, such as grain size, viscosity, etc.

The object is achieved with a distributor of the above discussed type, namely a mix distributor or filling a tray-like mold having a substantially constant thickness with the features of the appended claims.

In the case of manufacture of slabs with a veined effect, where a liquid or powder dye is distributed in a discontinuous manner, in zones or patches, onto the surface of the mix upstream of said hopper means, since the mix supplied by the hopper means is deposited on the conveyor means without being mixed, the deposited mix remains unaltered during the whole of the mold filling operation. The result is that the slabs have the same aesthetic properties over the whole of their surface.

Essentially the irregular and localized deposition of the dye in the mix does not vary during the various mix distribution stages, thereby enabling the formation of slabs with a veined effect which remains unchanged over the whole of their surface.

Moreover, the hopper means are equipped with intercepting means positioned in front of the mix discharge port and able to regulate the degree of opening of said port. Alternatively or additionally the conveyor means are provided with variable-speed motor means and/or motor means of the variable-speed type are used to displace said movable housing.

In this way, by simply varying respectively the degree of opening of the mix discharge port and/or the speed of advance of the conveyor means and/or the speed of displacement of the container means it is possible to vary the quantity of mix to be poured into the old and therefore the thickness of the mix layer.

The distributor also comprises load sensors able to weigh the hopper means together with the mix contained therein so as to determine with extreme ease the quantity of mix which is strictly necessary for filling the mold and in particular to control on continuous basis the throughput of the material poured from the distributor into the mold during its displacement.

These and further advantageous features of the present invention will emerge more clearly from the following detailed description provides by way of a non-limiting example with reference to the accompanying drawing in which.

In the enclosed figures, 10 denotes overall a mix distributor for filling a tray-like mole, 100 which is usually made of rubber and has a substantially constant thickness, with a mix 110 of agglomerate stone or ceramic material.

Figure 1:
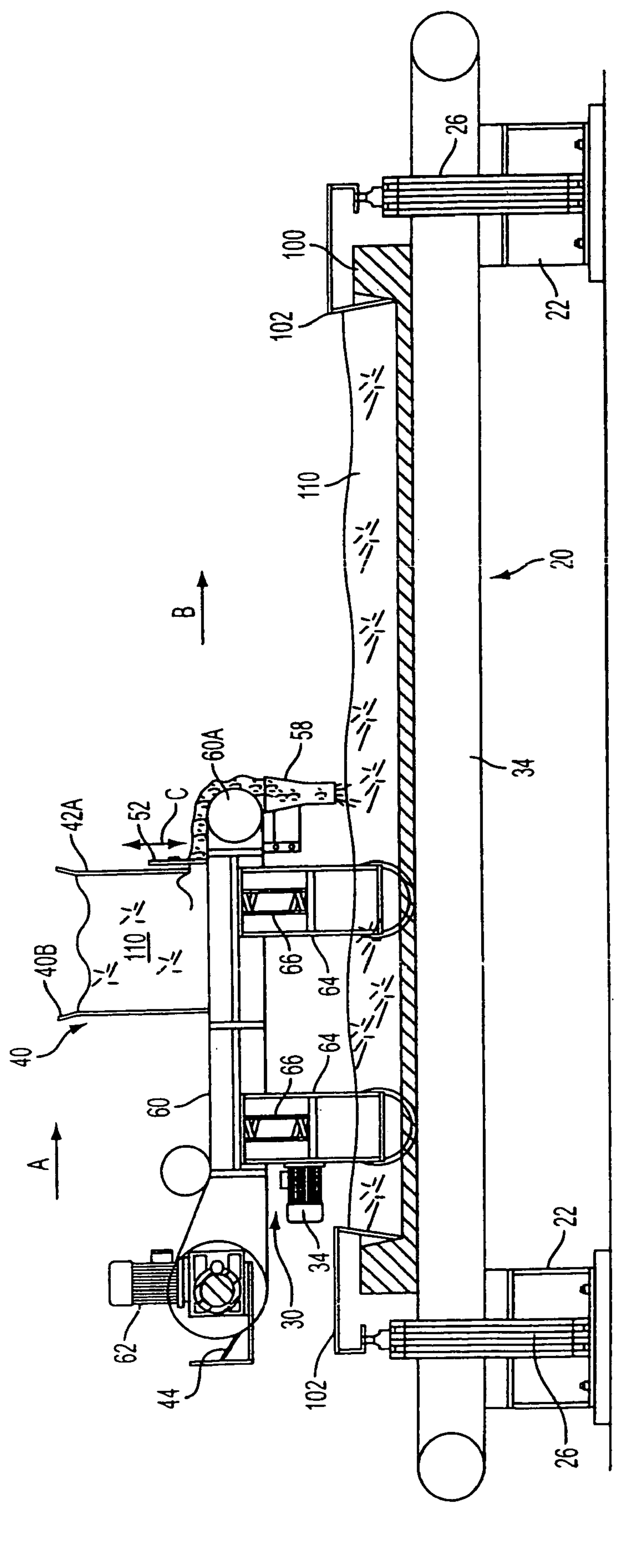
FIG. 1 is a schematic longitudinal view of a distributor according to the present invention.
Figure 2:
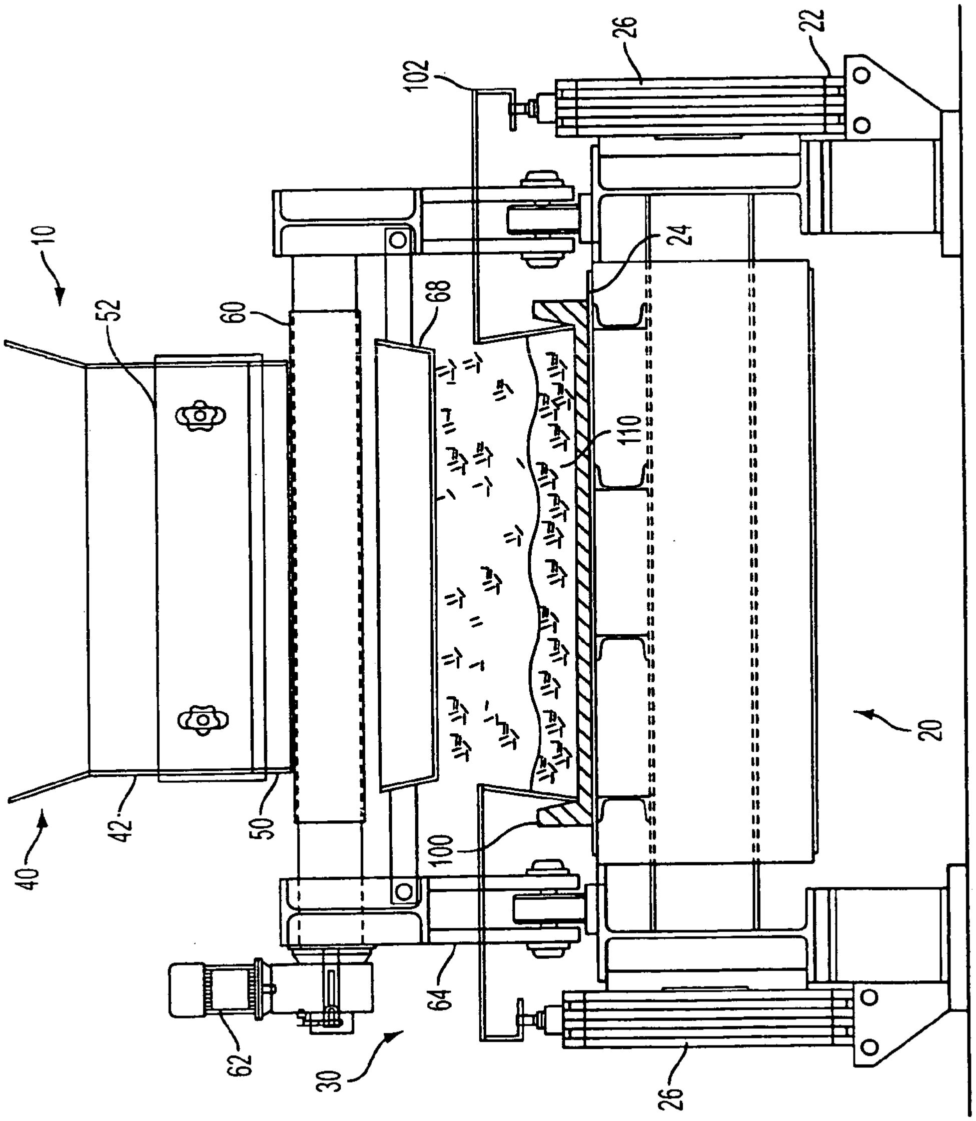
FIG. 2 is a front view of the distributor shown in FIG. 1, with some details omitted for a better clarity.
Figure 3:
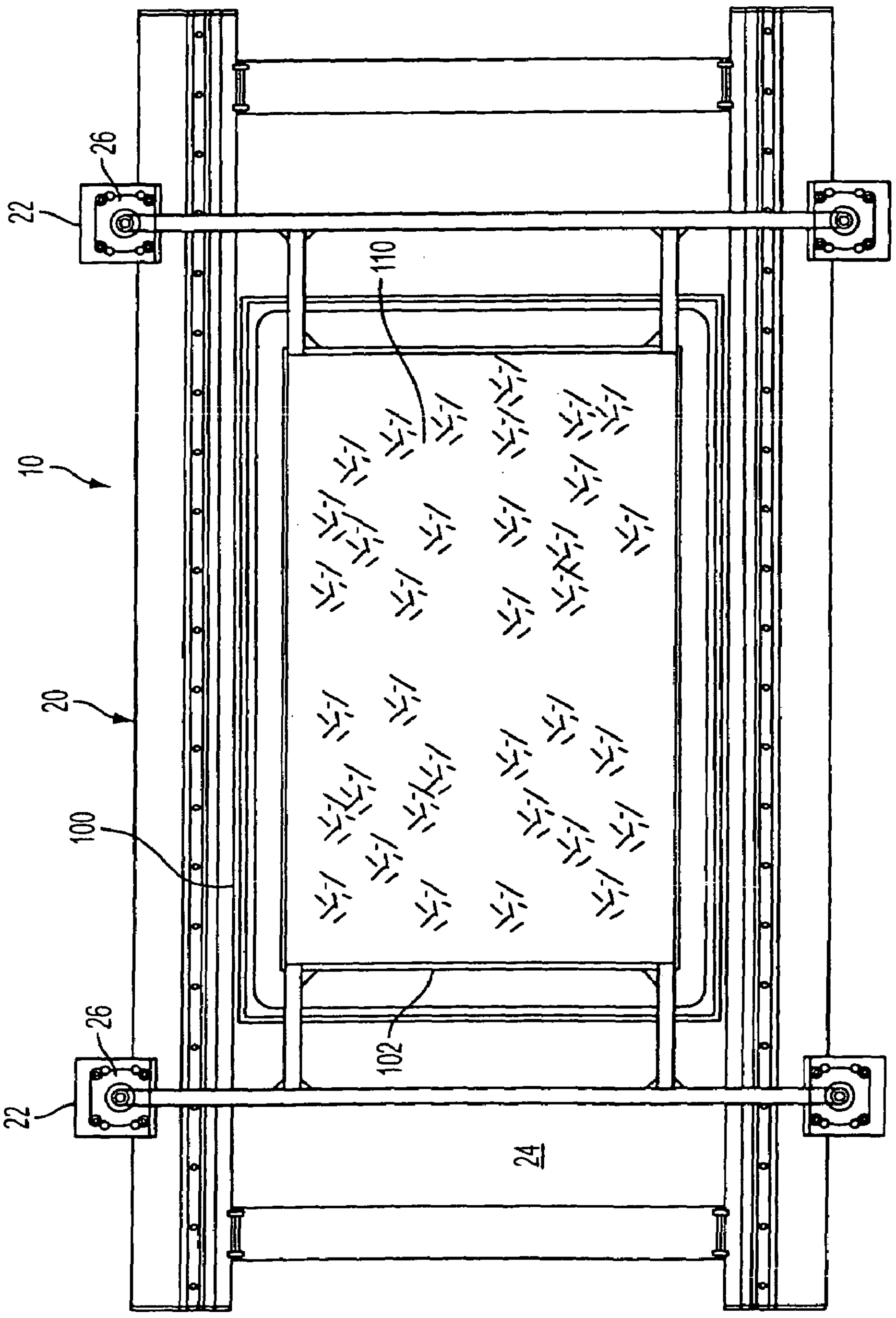
FIG. 3 is a top plan view of the same distributor where, for the sake of simplicity, some of the parts shown in the preceding figures have been omitted.

The distributor 10 comprises a fixed structure 20 including pillars 22 and a support surface 24 preferably consisting of a conveyor belt for allowing movement of the mold 100 positioned on top of it. A frame or border 102 for temporarily containing the mix is inserted inside the mold 100 before commencing filling. The frame 102 is connected to actuating cylinders 26 which are mounted on the fixed housing 20. The containing frame 102 has a higher greater than that of the adjacent permetral edge of the mold 100 so as to prevent the fresh and therefore soft mix from flowing over the said edge when it is poured into the mold with a thickness greater than the final thickness. Preferably, as shown in FIGS. 1 and 2, the frame 102 has walls inclined towards the inside of the mold so as to prevent spillage of the mix when the frame 102 is removed.

A movable housing 30 is arranged above the distribution surface 24, being displaceable parallel to said surface 24, above the mold 100, by means of sliding guides (not shown). The movable housing 30 is also provided with a variable-speed motor 24 which allows its speed of displacement to be varied.

Figure 4:
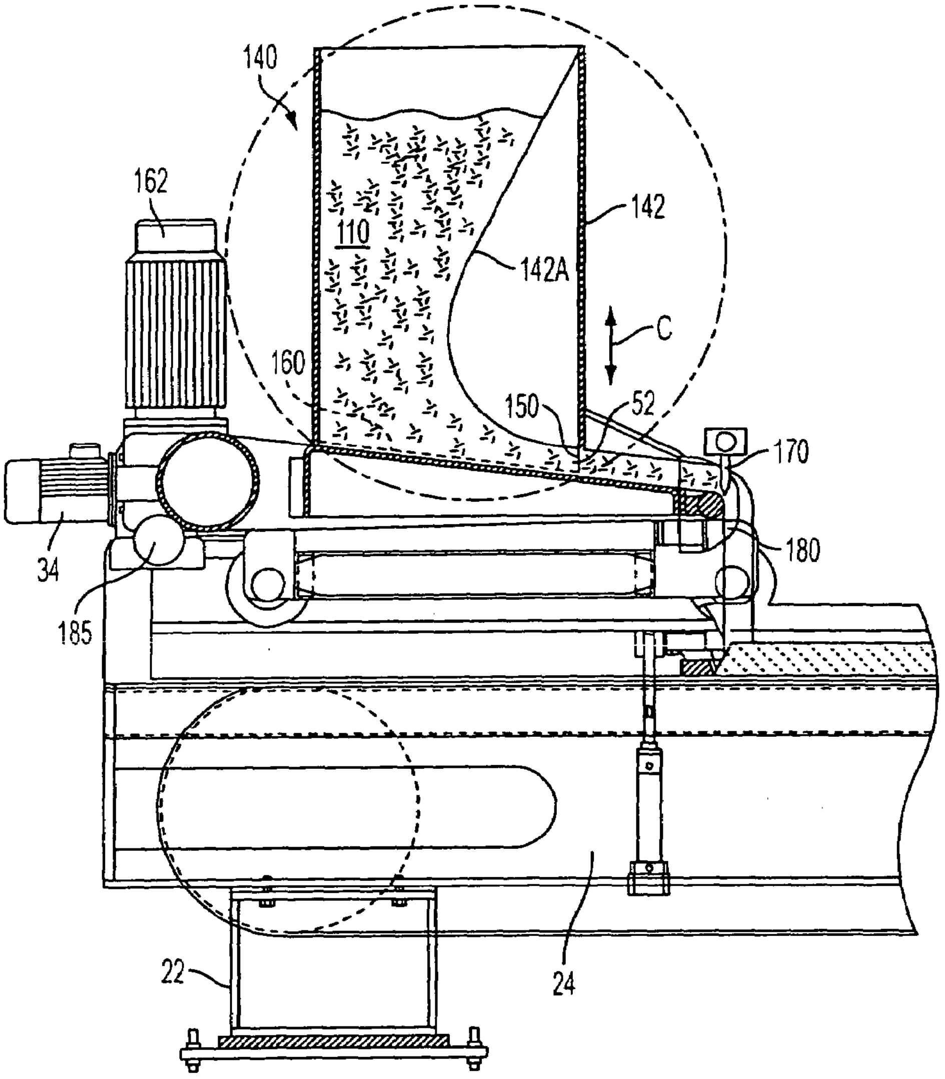
FIG. 4 is a more detailed longitudinal view of the same distributor.
Figure 6:
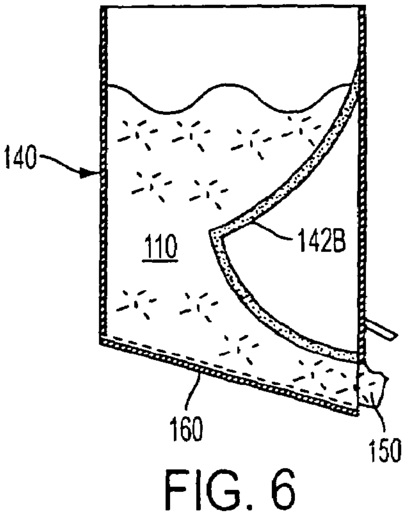
FIG. 6 shows a variant of the part enclosed in the circle indicated by a dot-dash line in FIG. 4.

The movable housing 30 supports, above it, a hopper for containing the mix of agglomerate material, formed by four side walls lined with an anti-adhesive material and having an upper mouth 143 through which the fresh mix is fed. The hopper consists of a fixed external structure (not shown) and an internal structure 40 which, by means of handles (also not shown), may be extracted from the structure and replaced with a structure having a different size depending on the size of the slab of agglomerate ceramic or stone material to be produced in the mold 100. The internal surface 40 of the hopper has a flat vertical rear wall 141 and a front wall 42 which has at its bottom end a discharge port 50 of the mix. According to a main feature of the present invention the front wall 42 has a profile in which the upper portion 42A is inclined towards the rear wall 141 and the lower portion 42B begins at the minimum distance from the rear wall and ends at said discharge port 50. The geometry of this profile may be varied, and consequently optimized, depending on the physical characteristics (grain size, viscosity, etc.) of the mix. FIGS. 4 and 6 show, exclusively by way of example, two of the possible profiles 42' and 142' of said front wall 42 of the hopper internal structure 40. As indicated by the double printed arrow C in FIGS. 1 and 4, either the whole internal surface 40 of the hopper or at least its front wall thereof 42 is vertically adjustable in order to vary the cross-section of the discharge port 50.

An extractor belt 60, driven by a variable-speed motor 62, able to receive the mix from the hopper 40 and forming the bottom thereof, is positioned underneath the hopper and integral with the movable housing 30. The top surface of the exterior belt 60, on which is deposited the mix flowing out from the internal structure 40 of the hopper through the discharge port 50, forms the bottom of the hopper and is inclined forwards, namely towards the discharge port 45 in the same manner as the lower portion 42B of the front wall 42 of the hopper internal structure 40. The mentioned inclination drives from fact that the driving roller 64 of the extractor belt 60 needs to have a given diameter to ensure a sufficiently strong pull while the idle roller (not visible in the drawing) has a much smaller diameter to ensure an optimum fall down of the mix 110. In this manner the invention provides that the mix flow:

- is substantially vertical and with a narrowing cross-section in the upper region of the hopper, namely in front of the upper portion 42A of the front wall 42 of the internal structure 40, and
- becomes parallel to said top surface of the extractor belt 60 in the lower region of the hopper, namely in front of the lower portion 42B of the front wall 42 of the internal structure 40.

Thanks to such profile of the front wall 42 of the internal structure 40, there is no accumulation of undischarged mix on the port 50, thus the thickness and the density of mix 110 flowing out from the said port are uniform. As a consequence the mix 110 is no longer poured in form of "spots" but as a continuous layer in the mold 100.

The conveyor belt 60 is provided with a controlled-speed and adjustable motor 62, so that it is possible to vary the speed of discharge of the mix and therefore the throughput of the mix which is poured into the mold 100.

The mix 110 coming out of the hopper through the discharge port 50 is conveyed at a controlled speed to the free end 60A of the extractor belt 60, where the mix falls by means of gravity and is uniformly distributed inside the mold 100. A guide chute 68 is provided at the free end 60A of the conveyor belt 60, said chute—as shown in FIG. 2—extending transversely over practically the whole width of the mold 100 so as to favor the distribution of the mix therein.

The movable housing 30 is mounted on supports 64 provided with load sensors so as to monitor the weight of the mix 110 deposited on the extractor belt 60 and therefore to control the throughput of the mix poured into the mold 100, with the possibility of adjusting it by varying the speed of the belt 60 and/or the speed of displacement of the movable housing 30.

Figure 5:
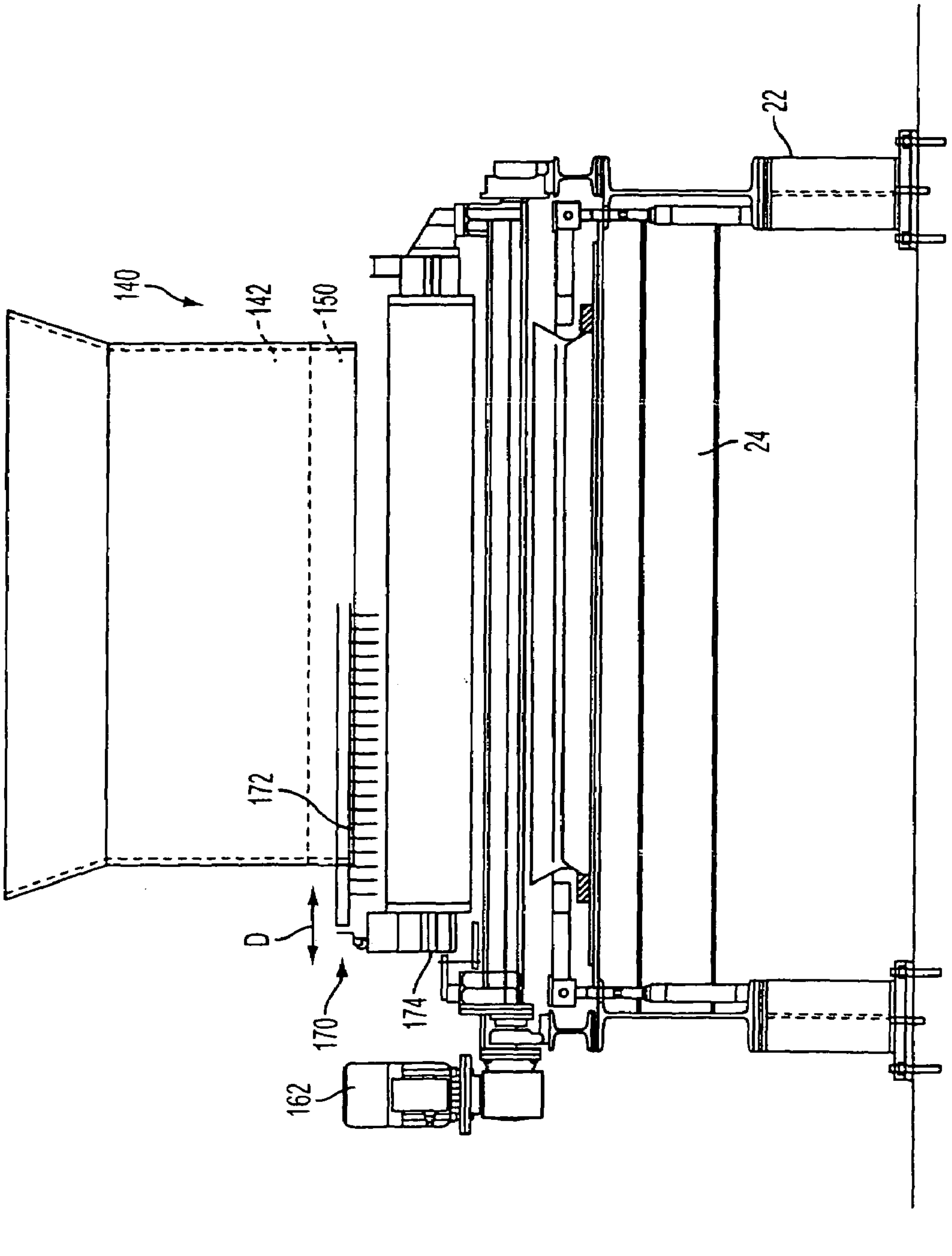
FIG. 5 is another front view showing the details omitted in FIG. 2.

As shown in FIG. 5—in front of the discharge port 50 there is a comb or rake-like device 170 provided with a connecting rod and crank mechanism 174 which imparts to said device an alternating movement in a vertical plane parallel to the cross section of the discharge port 50, as indicated by the arrow D. In this way the teeth 172 of the device 170 break up any lumps which form in the mix 110 before the latter falls into the mold 100, so that the layer of mix inside the mold 100 is even more uniform;

A scraper device 180—see FIG. 5—is present at a given radial distance from the already mentioned idle roller of the extractor belt 60, said scraper device being characterized by a blade which, at the end of filling of the mold 100, scrapes off any residual amount of mix 110 supplied by the present distributor remaining attached to the extractor belt 60.

On the opposite side of the internal structure 40 of the hopper, there is also a cylindrical brush 185 having a horizontal axis—see FIG. 4—which is actuated by an associated motor (not shown) and which completes the work of the scraper device 180 for a carefully cleaning of the extractor belt 60.

The operating principle of the distributor is now described. In its starting position the hopper is filled with a quantity of mix slightly greater than that which is required to form a slab. Owing to the load sensors and since the weight when empty (tare) of the movable housing 30 is known, the hopper can be loaded with the desired quantity of mix (for example the quantity required for forming a slab).

The movable housing 30, together with the hopper and therefore also the extractor belt 60, is initially positioned at one end of the fixed housing 20 so that the mix 110 is poured starting from one end of the mold 100.

In order to commence filling of the mold 100, the motor 62 is energized in order to advance the extractor belt 60, then also the motor 34 is energized in order to displace the movable housing 30. The advancing movement—indicated by arrow A—of the extractor belt 60 and therefore the mix deposited thereon occurs in the same direction as the displacement of the movable housing 30—indicated by the arrow B, see FIG. 4.

The mix flows out of the discharge port 50 and at the end 60A of the extractor belt 60 falls inside the mold 100, being guided at the chute 68. The displacement of the movable housing 30 continues so as to pour the mix 110 inside the whole length of the mold 100.

It should be noted that the mix may be poured into the mold 100 either during the outward travel movement only or may be poured, if necessary, both during the outward and the return travel movement, thereby allowing a reinforcing element of the end product, such as for example a meshwork, to be inserted between the two layers of mix.

It should be noted that the thickness of the mix poured into the mold 100 depends on the rate of discharge of the mix from the extractor belt 60 (which is controlled continuously by the computer which manages the load sensors) and may be modified very easily in three different ways:

1. by adjusting the height of the discharge port 50 through a vertical displacement of at least the front wall 42 of the hopper internal structure 40;
2. by adjusting the sped of displacement of the movable housing 30;
3. by adjusting the speed of advancing movement of the extractor belt 60.

By reducing the height of the discharge port 50 or by increasing the speed of displacement of the movable housing 30 or by slowing down the speed of advancing movement of the extractor belt 60, the thickness of the layer of mix 110 poured into the mold 100 decreases. Conversely, by increasing the height of the discharge port 50 or by slowing down the speed of displacement of the movable housing 30 or by increasing the speed of advancing movement of the extractor belt 60, the thickness of the layer of mix 110 poured into the mold 100 increases.

In view of the ease of performing filling of the hopper with the desired quantity of mix, for example that required for forming a slab, due to the use of the load sensors, and in view of the precision and immediacy of the adjustments necessary for pouring into the mold 100 a layer of mix 110 of a predefined thickness in one or more passes, without the mix being remixed as it passes from the hopper to the mold 100, a slab with optimum aesthetic properties which are constant over the whole of its surface is always obtained. Equally evident is the simplicity in construction of the device and the extreme ease with which it may be cleaned in order to allow use of a different colored mix.

Finally it is clear that the scope of protection of the following claims also includes any further modifications or changes which are functionally or conceptually equivalent to that claimed below.

The invention claimed is:

1. A distributor for filling a mold with a mix of an agglomerated material, the distributor comprising:

a fixed structure;

a first endless belt having a top surface and being movably supported by the fixed structure, the mold being placed on the top surface for the purpose of receiving the mix;

a movable housing supported on the fixed structure, the movable housing comprising a movable second endless belt integral with the movable housing, the second endless belt for depositing the mix into the mold by gravity, the second endless belt comprising a first and second roller, the first roller having a larger diameter than the second roller so that a top surface of the second endless belt is inclined relative to the first endless belt and so that the top surface of the second endless belt has a lowest most portion which is closer to the first endless belt than a highest most portion, a hopper supported by the movable housing, the hopper for holding a quantity of the mix in an inner space defined at least partially by a pair of spaced apart walls and comprising a side-discharge port for discharging the mix onto the second endless belt;

wherein the pair of spaced apart walls comprise a vertical flat wall disposed distal from the port and a wall proximal to the port having a profiled wall section, the profiled wall section extending inwards into the inner space relative to the vertical flat wall to create a channel passage of the mix to the port, and wherein the profiled wall section is vertically adjustable to vary the channel passage of the mix to the port.

2. The distributor of claim 1 further comprising a scraper and brush for cleaning residual portions of mix from the second endless belt, the scraper and brush being placed proximal to the lowest most portion.

3. The distributor of claim 1, wherein the movable housing comprises a first motor for moving the movable housing.

4. The distributor of claim 1, wherein the movable housing comprises a second motor for driving the second endless belt.

5. The distributor of claim 1, wherein the movable housing comprises a load sensor for monitoring a weight of the mix on the second endless belt.

6. The distributor of claim 1 further comprising a rake having a plurality of teeth for screening the mix prior to placing the mix into the mold.

7. The distributor of claim 1 further comprising a guide chute for guiding the mix into the mold, the guide chute being proximal to the lowest most portion of the second endless belt.

8. The distributor of claim 7, wherein the guide chute is extends transversely to match a width of the mold.

9. The distributor of claim 1, wherein the mold comprises a tray-like shape and comprises rubber.

10. The distributor of claim 1, wherein a frame is connected to an actuating cylinder mounted on the fixed structure.

11. The distributor of claim 1, wherein the top surface of the second endless belt comprises a bottom of the hopper.

12. The distributor of claim 1 further comprising a frame connected to the fixed structure, the frame placed in the mold to prevent spillage of the mix during placement of the mix.

13. The distributor of claim 5 further comprising an algorithm for determining a desired quantity to be loaded into the hopper.

14. The distributor of claim 10, wherein the frame is connected to a plurality of actuating cylinders.

15. A distributor for filling a mold with a mix of an agglomerated material, the distributor comprising:

a fixed structure;

a first endless belt having a top surface and being movably supported by the fixed structure, the mold being placed on the top surface for the purpose of receiving the mix;

a movable housing supported on the fixed structure, the movable housing comprising a movable second endless belt integral with the movable housing, the second endless belt for depositing the mix into the mold gravity, the second endless belt comprising a first and second roller, the first roller having a larger diameter than the second roller so that a top surface of the second endless belt is inclined relative to the first endless belt and so that the top surface of the second endless belt has a lowest most portion which is closer to the first endless belt than a highest most portion, a hopper supported by the movable housing, the hopper for holding a quantity of the mix in an inner space defined at least partially by a pair of spaced apart walls and comprising a side-discharge port for discharging the mix onto the second endless belt;

wherein the pair of spaced apart walls comprise a vertical flat wall disposed distal from the port and a wall proximal to the port having a profiled wall section, the profiled wall section extending inwards into the inner space relative to the vertical flat wall to create a channel passage of the mix to the port; and wherein the profiled wall section is vertically adjustable to vary the channel passage of the mix to the port; and wherein a portion of the profiled wall section comprises a portion of the port, and wherein the profiled wall section is vertically adjustable to vary a cross-section of the port.

* * * * *